US007526508B2

(12) United States Patent
Tan et al.

(10) Patent No.: US 7,526,508 B2
(45) Date of Patent: Apr. 28, 2009

(54) SELF-MANAGING DATABASE ARCHITECTURE

(75) Inventors: Leng Leng Tan, Sunnyvale, CA (US); Gianfranco Putzolu, San Francisco, CA (US); Richard Sarwal, Portola Valley, CA (US); Alex Tsukerman, Foster City, CA (US); Gary C. Ngai, Saratoga, CA (US); Graham Stephen Wood, El Granada, CA (US); Karl Dias, Foster City, CA (US); Mark Ramacher, San Carlos, CA (US); Benoit Dageville, Foster City, CA (US); Mohamed Ziauddin, Pleasanton, CA (US); Tirthankar Lahiri, Santa Clara, CA (US); Sujatha Muthulingam, Mountain View, CA (US); Vishwanath Karra, San Jose, CA (US); Francisco Sanchez, San Carlos, CA (US); Hsiao-Te Su, Milpitas, CA (US); Wanli Yang, San Mateo, CA (US); Vasudha Krishnaswamy, Fremont, CA (US); Sushil Kumar, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 328 days.

(21) Appl. No.: 10/934,076

(22) Filed: Sep. 3, 2004

(65) Prior Publication Data

US 2005/0086195 A1    Apr. 21, 2005

Related U.S. Application Data

(60) Provisional application No. 60/500,869, filed on Sep. 4, 2003, provisional application No. 60/588,705, filed on Jul. 16, 2004.

(51) Int. Cl.
*G06F 17/30* (2006.01)

(52) U.S. Cl. .......................................... 707/200; 707/2
(58) Field of Classification Search .................... 707/2, 707/200
See application file for complete search history.

(56) References Cited

U.S. PATENT DOCUMENTS 2,883,255 A     4/1959    Anderson (Continued)

FOREIGN PATENT DOCUMENTS

JP          55-91036 A         7/1980

(Continued)

OTHER PUBLICATIONS

Chaudhuri et al. "Self Managing DBMS Technology at Microsoft", Sep. 1, 2004, Microsoft Research.*

(Continued)

*Primary Examiner*—Charles Rones
*Assistant Examiner*—Yuk Ting Choi
(74) *Attorney, Agent, or Firm*—Townsend and Townsend and Crew LLP

(57) ABSTRACT

An intelligent database infrastructure wherein the management of all database components is performed by and within the database itself by integrating management of various components with a central management control. Each individual database component, as well as the central management control, is self-managing. A central management control module integrates and interacts with the various database components. The database is configured to automatically tune to varying workloads and configurations, correct or alert about bad conditions, and advise on ways to improve overall system performance.

22 Claims, 4 Drawing Sheets

U.S. PATENT DOCUMENTS

| | | | |
|---|---|---|---|
| 3,324,458 A | 6/1967 | MacArthur | |
| 3,344,408 A | 9/1967 | Singer et al. | |
| 3,351,910 A | 11/1967 | Miller et al. | |
| 4,654,806 A | 3/1987 | Poyser et al. | |
| 4,849,879 A | 7/1989 | Chinnaswamy et al. | |
| 4,994,986 A | 2/1991 | Cihiwsky et al. | |
| 5,303,166 A | 4/1994 | Amalfitano et al. | |
| 5,349,662 A | 9/1994 | Johnson et al. | |
| 5,488,648 A | 1/1996 | Womble | |
| 5,729,736 A | 3/1998 | Gomi et al. | |
| 5,734,884 A | 3/1998 | Eberhard et al. | |
| 5,778,350 A * | 7/1998 | Adams et al. | 707/1 |
| 5,781,703 A | 7/1998 | Desai et al. | |
| 5,796,633 A | 8/1998 | Burgess et al. | |
| 5,872,976 A | 2/1999 | Yee et al. | |
| 5,905,868 A | 5/1999 | Baghai et al. | |
| 5,960,423 A * | 9/1999 | Chaudhuri et al. | 707/2 |
| 6,003,022 A | 12/1999 | Eberhard et al. | |
| 6,029,163 A | 2/2000 | Ziauddin | |
| 6,035,306 A | 3/2000 | Lowenthal et al. | |
| 6,052,694 A | 4/2000 | Bromberg | |
| 6,223,171 B1 * | 4/2001 | Chaudhuri et al. | 707/2 |
| 6,282,570 B1 | 8/2001 | Leung et al. | |
| 6,311,175 B1 | 10/2001 | Adriaans et al. | |
| 6,363,282 B1 | 3/2002 | Nichols et al. | |
| 6,389,430 B1 | 5/2002 | Parker | |
| 6,434,714 B1 | 8/2002 | Lewis et al. | |
| 6,467,052 B1 | 10/2002 | Kaler et al. | |
| 6,510,419 B1 | 1/2003 | Gatto | |
| 6,553,369 B1 | 4/2003 | Guay et al. | |
| 6,615,222 B2 | 9/2003 | Hornibrook et al. | |
| 6,665,815 B1 | 12/2003 | Goldstein et al. | |
| 6,671,830 B2 | 12/2003 | Kaler et al. | |
| 6,691,254 B2 | 2/2004 | Kaler et al. | |
| 6,766,318 B1 | 7/2004 | Soule et al. | |
| 6,775,676 B1 | 8/2004 | Briam et al. | |
| 6,792,460 B2 | 9/2004 | Oulu et al. | |
| 6,801,903 B2 | 10/2004 | Brown et al. | |
| 6,804,627 B1 * | 10/2004 | Marokhovsky et al. | 702/182 |
| 6,901,582 B1 | 5/2005 | Harrison | |
| 6,952,692 B1 | 10/2005 | Bhattiprolu et al. | |
| 6,954,717 B2 | 10/2005 | Boldt et al. | |
| 6,955,302 B2 | 10/2005 | Erdman, Jr. | |
| 6,983,257 B2 | 1/2006 | Gatto | |
| 7,051,013 B2 | 5/2006 | Horman et al. | |
| 7,085,786 B2 | 8/2006 | Carlson et al. | |
| 7,089,347 B2 | 8/2006 | Mogi et al. | |
| 7,093,169 B2 | 8/2006 | Merriam | |
| 7,139,749 B2 | 11/2006 | Bossman et al. | |
| 7,292,961 B2 | 11/2007 | Dias et al. | |
| 7,376,682 B2 | 5/2008 | Ramacher et al. | |
| 2002/0065833 A1 | 5/2002 | Litvin | |
| 2002/0087587 A1 * | 7/2002 | Vos et al. | 707/203 |
| 2002/0091708 A1 | 7/2002 | Vos et al. | |
| 2002/0173997 A1 | 11/2002 | Menard et al. | |
| 2002/0178146 A1 * | 11/2002 | Akella et al. | 707/2 |
| 2003/0120620 A1 * | 6/2003 | Fromherz et al. | 706/45 |
| 2004/0044500 A1 | 3/2004 | Lu | |
| 2004/0044700 A1 | 3/2004 | Fisher et al. | |
| 2004/0059704 A1 * | 3/2004 | Hellerstein et al. | 707/1 |
| 2004/0064544 A1 | 4/2004 | Barsness et al. | |
| 2004/0098265 A1 * | 5/2004 | Kelly et al. | 704/270 |
| 2005/0055673 A1 | 3/2005 | Dias et al. | |
| 2005/0086242 A1 | 4/2005 | Ngai et al. | |
| 2005/0086246 A1 | 4/2005 | Wood et al. | |
| 2005/0086263 A1 | 4/2005 | Ngai et al. | |
| 2005/0103874 A1 | 5/2005 | Erdman | |
| 2005/0278381 A1 | 12/2005 | Diao et al. | |
| 2006/0218450 A1 | 9/2006 | Malik et al. | |
| 2007/0022192 A1 | 1/2007 | Nguyen et al. | |

FOREIGN PATENT DOCUMENTS

| | | |
|---|---|---|
| JP | 02-232795 A | 9/1990 |
| WO | WO 02/06949 A2 | 1/2002 |
| WO | WO 02/37061 A1 | 5/2002 |

OTHER PUBLICATIONS

Lighstone et al. "Toward Autonomic Computing with DB2 Universal Database", Sep. 2002, SIGMOND Record, vol. 31, No. 3, 55-61.*

Lohman et al. "SMART: Making DB2 (More) Autonomic", Proceedings of the 28th VLDB Confernece, Hong Kong, China, 2002.*

Kleewein et al. "Autonomic Computing for Relational Databases: The Ten-Year Vision", IEEE, Aug. 2003.*

Doppelhammer et al., "Database Performance in the Real World: TPC-D and SAP R/3," *ACM*, 1997, pp. 123-134.

Hagmann et al., "Performance Analysis of Several Back-End Database Architectures," *ACM*, 1986, pp. 1-26.

IBM Technical Disclosure Bulletin, "Software Monitor for Performance Tuning a Virtual Memory Computer System," May 1, 1973, vol. No. 15. Issue No. 12, pp. 3730-3733.

International Search Report mailed on Jan. 4, 2005, for PCT Application No. Pct/US04/29069, filed on Sep. 3, 2004, 1 page.

Ryu et al., "Analysis of Database Performance with Dynamic Locking," *ACM*, 1990, pp. 491-523.

Stonebraker et al., "Performance Enhancements to a Relational Database System." *ACM*, 1983, pp. 167-185.

* cited by examiner

SELF-MANAGING DATABASE ARCHITECTURE

CROSS-REFERENCES TO RELATED APPLICATIONS

This application is a non-provisional of U.S. Provisional Application Ser. Nos. 60/500,869, filed Sep. 4, 2003, and 60/588,705, filed Jul. 16, 2004, the contents of which are each hereby incorporated by reference.

BACKGROUND OF THE INVENTION

The present invention relates to databases, and more particularly to automatic database management. In certain aspects, the present invention provides a self-managing database system architecture.

In today's around-the-clock economy, an efficient and reliable IT infrastructure is paramount for the success of an enterprise. As businesses increasingly rely on such an infrastructure to service customers and partners, and disseminate information among employees, computer systems are no longer peripheral to the management of core business. Even a temporary outage of a critical application may jeopardize the viability of the entire business. Revenue and customers may be lost, penalties could be owed and, the resulting unfavorable publicity can have a disastrous affect on customer confidence and corporate stock valuation. The effective management of the enterprise IT infrastructure is therefore key to the success of modern enterprises.

Recognizing this need, companies today are investing significant amounts of financial and administrative resources to ensure the best possible management of their IT infrastructure. However, organizations today are forced to deal with more data than ever, with customers and employees requiring 24 hour access to this data, from more places, via more type of devices. As IT vendors deliver increasingly sophisticated solutions to meet such exacting demands, the task of systems management has never been more complex. Hiring highly skilled administrative staff to manage such complicated environments is an expensive proposition. This coupled with frequent shortage of experienced administrative personnel often results in spiraling management costs.

While adjusting to new technologies and business practices presents numerous technical challenges, businesses today are also faced with increased competition as the Internet has collapsed the world into a small global village. An online bookseller in Seattle faces as much competition from other booksellers in the US as it does from one in China. In order to maintain business profitability amidst ever-growing competitive pressure, corporations must minimize their operating expenses with system administration costs being no exception. This creates an interesting corporate challenge. Enterprises must manage their systems and data much more effectively than ever—to ensure the highest performance, scalability and availability—but at a cost significantly lower than before.

In prior database systems, proper on-going management and tuning of the database are done with a lot of manual intervention by database administrators (DBAs) and with help from external tools. Much raw data is pulled out of the database to perform this external management, and much of this information pulled out of the database is redundant. In addition, management of one component of the database is usually done in isolation from another. Previous Database management techniques result in sub-optimal database performance, stability and availability and require highly-skilled DBAs.

Ongoing database administration tasks, such as performance tuning, space management, system resource tuning and backup & recovery, account for the biggest chunk of a database administrator's time. According to a survey conducted by Oracle, DBAs typically spend about 55% of their time performing these activities.

Accordingly, it is desirable to provide systems and methods that make the database as self-managing as possible so that operation of the database requires minimal manual administration. Such a database system should be self-aware, self-tuning, self-learning and substantially self-managing.

BRIEF SUMMARY OF THE INVENTION

Embodiments of the present invention include a database configured to manage itself. In certain aspects, an intelligent infrastructure is provided wherein the management of all database components is performed by and within the database itself by integrating management of various components with a central management control. Each individual database component, as well as the central management control, is self-managing.

In one embodiment, the database system of the present invention includes an intelligent infrastructure having a plurality of interacting components. Intelligent Infrastructure components include an Automatic Workload Repository component, an Automatic Maintenance Task component, a Server-generated Alerts component and a Uniform Advisory component. The Automatic Workload Repository (AWR) component efficiently computes and captures important statistics and workload information of the database. Periodically, the information is automatically flushed to disk. This information may be used to tune the system. The Automatic Maintenance Task (AMT) component automatically monitors and detects bad conditions. If the conditions can be corrected by the database, the AMT automatically schedules the corrective maintenance task(s). The maintenance tasks run in a system-defined window, and the resource consumption of the tasks can be controlled using a separate resource management component, such as, e.g., Oracle's Resource Manager component. The Server-generated Alerts component automatically pushes alerts to warn DBAs to take action if the bad conditions detected cannot be corrected without manual intervention. These alerts are detected proactively by the database itself, and are not done by polling from external sources. The Uniform Advisory component provides a common advisory infrastructure used to ease integration of a plurality of advisor modules.

In one embodiment, a central management control module, hereinafter termed the Automatic Database Diagnostic Monitor (ADDM), is provided to integrate and interact with the various database components. The ADDM performs database-wide performance diagnostic services, and provides performance improvement recommendations periodically, e.g., using a classification tree based on Time and Wait models. Typical database components include SQL/Application, System Resource, Internal Space, External Storage, and Backup/Recovery components. SQL/Application components typically include components or modules such as Automatic SQL Tuning, Automatic SQL Analysis, Access Advisor, Automatic Gathering and Versioning of Optimizer Statistics components and others.

With the novel self-managing database architecture of the present invention, the skill level of DBAs and the amount of DBA time needed to properly manage a database is advantageously reduced. In certain aspects, the database is configured to automatically tune to varying workloads and configurations, correct or alert about bad conditions, and advise on ways to improve overall system performance.

According to an aspect of the present invention, a self managing database system is provided that typically includes a database, a database server that provides access to the database for a plurality of user systems, and a statistics repository module configured to automatically and periodically collect and compute performance statistics of the database and database server. The system also typically includes a plurality of database modules comprising one or more infrastructure components and one or more self-management components, each database module configured to retrieve and analyze statistics from the statistics repository module, each also configured to perform at least one of a plurality of database performance enhancement operations, and a central control module configured to interface with the database, the database server, the statistics repository module and the database modules, the control module configured to automatically analyze statistics from the statistics repository module and to control operation of the database modules based on a result of the statistics analysis so as to enhance database performance. Each self-management component is able to self manage an aspect of database functionality, in part by using one or more of the infrastructure components. In one aspect, database enhancement operations performed by the various database modules include operations that enhance database performance such as operational speed, CPU usage, database availability, database stability and others.

According to another aspect of the present invention, a method is provided for the self-managing operation of a database system. The method typically includes, from within the database, automatically collecting performance statistics for the database system and automatically analyzing the collected statistics within the database to determine one or more performance related problems. The method also typically includes, within the database, processing a performance related problem by either one or more of: 1) automatically correcting the performance problem if the problem is self-correctable by the database system, or 2) automatically alerting a user system to the performance related problem, or 3) automatically providing a recommended solution to correct the problem.

According to yet another aspect of the present invention, a computer-readable medium is provided that includes code for controlling a database system to automatically self-manage operation of a database. The code typically includes instructions for controlling one or more processors in the database system automatically collect performance statistics for the database system within the database, and automatically analyze the collected statistics within the database system to determine one or more performance related problems. The code also typically includes instructions to, within the database system, process a performance related problem by either one or more of: 1) automatically correcting the performance problem if the problem is self-correctable by the database system, or 2) automatically alerting a user system to the performance related problem, or 3) automatically and providing a recommended solution to correct the problem.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

As the business environment becomes increasingly competitive, the challenge before today's enterprise is to manage their information technology (IT) infrastructure at the lowest possible cost without compromising service level objectives. This presents an interesting dilemma since as systems provide more and more capabilities, system complexity can increase, and hence these systems can become expensive to manage and maintain. Recognizing these demands, embodiments of the invention provide a sophisticated self-managing database that automatically monitors, adapts, and fixes itself. The self-managing solutions provided by the present invention allow DBAs to become more productive, help their organizations reduce management costs, and scale efficiently.

System Framework Architecture

Figure 1:
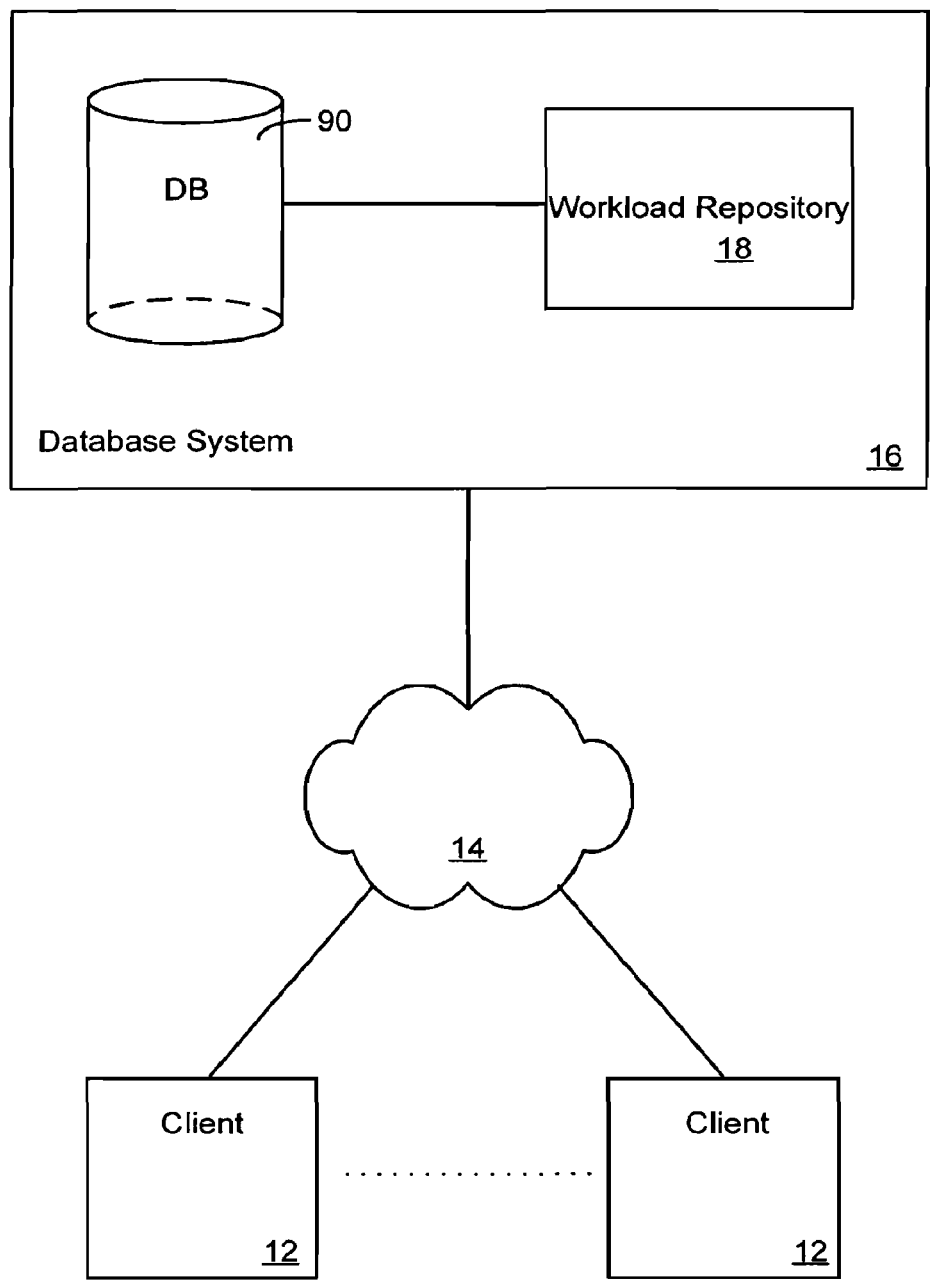
FIG. 1 illustrates a database system wherein a self managing architecture of the present invention might be used.

FIG. 1 illustrates a database system 16 wherein the self managing architecture of the present invention might be used. As illustrated in FIG. 1 any user systems 12 might interact via a network 14 with database system 16. The users of those user systems 12 might be users in differing capacities and the capacity of a particular user system 12 might be entirely determined by the current user. For example, where a developer is using a particular user system 12 to interact with database system 16, that user system has the capacities allotted to that developer. However, while an administrator (e.g., DBA) is using that user system to interact with system 16, it has the capacities allotted to that administrator. System 16 also includes, in one aspect, a separate storage module (not shown), such as one or more hard disks for storing collected statistics and other data.

Network 14 can be a LAN (local area network), WAN (wide area network), wireless network, point-to-point network, star network, token ring network, hub network, or other configuration. One of the most common type of network in current use is a TCP/IP (Transfer Control Protocol and Internet Protocol) network such as the global internetwork of networks often referred to as the "Internet" with a capital "I." For example, user systems 12 might communicate with system 16 using TCP/IP and, at a higher network level, use other common Internet protocols to communicate, such as HTTP, FTP, AFS, WAP, etc.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs a client interface module, such as an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., DBA) of user system 12 to access, process and view information and pages available to it from system 16 over network 14. Each user system 12 also typically includes one or more user interface devices, such as a keyboard, a mouse, touch screen, pen or the like, for interacting with a graphical user interface (GUI) provided on a display (e.g., monitor screen, LCD display, etc.) in conjunction with pages, forms and other information provided by system 16 or other systems or servers. The client interface module of system 12 typically implements or interfaces with a server module (not shown, but may be referred to herein as an Enterprise Management module) configured to create web pages for display on client 12 in response to requests from client 12. As discussed above, the present invention is suitable for use with any type of network such as the Internet, an intranet, an extranet, a virtual private network (VPN), a non-TCP/IP based network, any LAN or WAN or the like.

According to one embodiment, each user system 12 and all of its components are operator configurable using applications, including computer code run using a central processing unit such as an Intel Pentium processor or the like. Similarly, database system 16 and all of its components might be operator configurable using application(s) including computer code run using a central processing unit such as an Intel Pentium processor or the like, or multiple processor units. Computer code for operating and configuring database system 16, and its various components as described herein, to intercommunicate and to process and store tables, pages and other objects, data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, XML, Java, JavaScript, or any other scripting language, such as VBScript, Perl, Python, or TCL.

According to one embodiment, system 16 includes a database 90 for storing objects and data according to various object schema, and a statistics repository 18 for collecting and storing database performance statistics and data. In preferred aspects, statistics repository 18 is stored within database 90. Database 90 typically stores data created and used by an enterprise. In one embodiment, database 90 is a relational database, and database system 16 implements a database server management application (e.g., Oracle 10 g) adapted to store, update and retrieve data based on SQL-formatted and other types of commands. If more than one database system is used, they may be located in close proximity to one another (e.g., in a server farm located in a single building or campus), or they may be distributed at locations remote from one another (e.g., one or more servers located in city A and one or more servers located in city B). The system 16, in one aspect, could be implemented in a standalone system with an associated data storage repository or database, or it could include one or more logically and/or physically connected servers distributed locally or across one or more geographic locations. Additionally, the term "server" is meant to include a computer system, including processing hardware and process space(s), and an associated database storage system and database server application (e.g., Oracle RDBMS such as Oracle 10 g) as is well known in the art. It should also be understood that "server system" and "oserver" may be used interchangeably herein. Additionally, the code for implementing a database system and its various components may execute in one or more processors on one or more database systems. Thus, a database system described herein can be implemented as a single database, a distributed database, a collection of distributed databases, a database with redundant online or offline backups or other redundancies, etc., and might include a distributed database or storage network and associated processing intelligence. The database may also be implemented in a clustered environment, e.g., a Real Application Cluster or "RAC."

Figure 2:
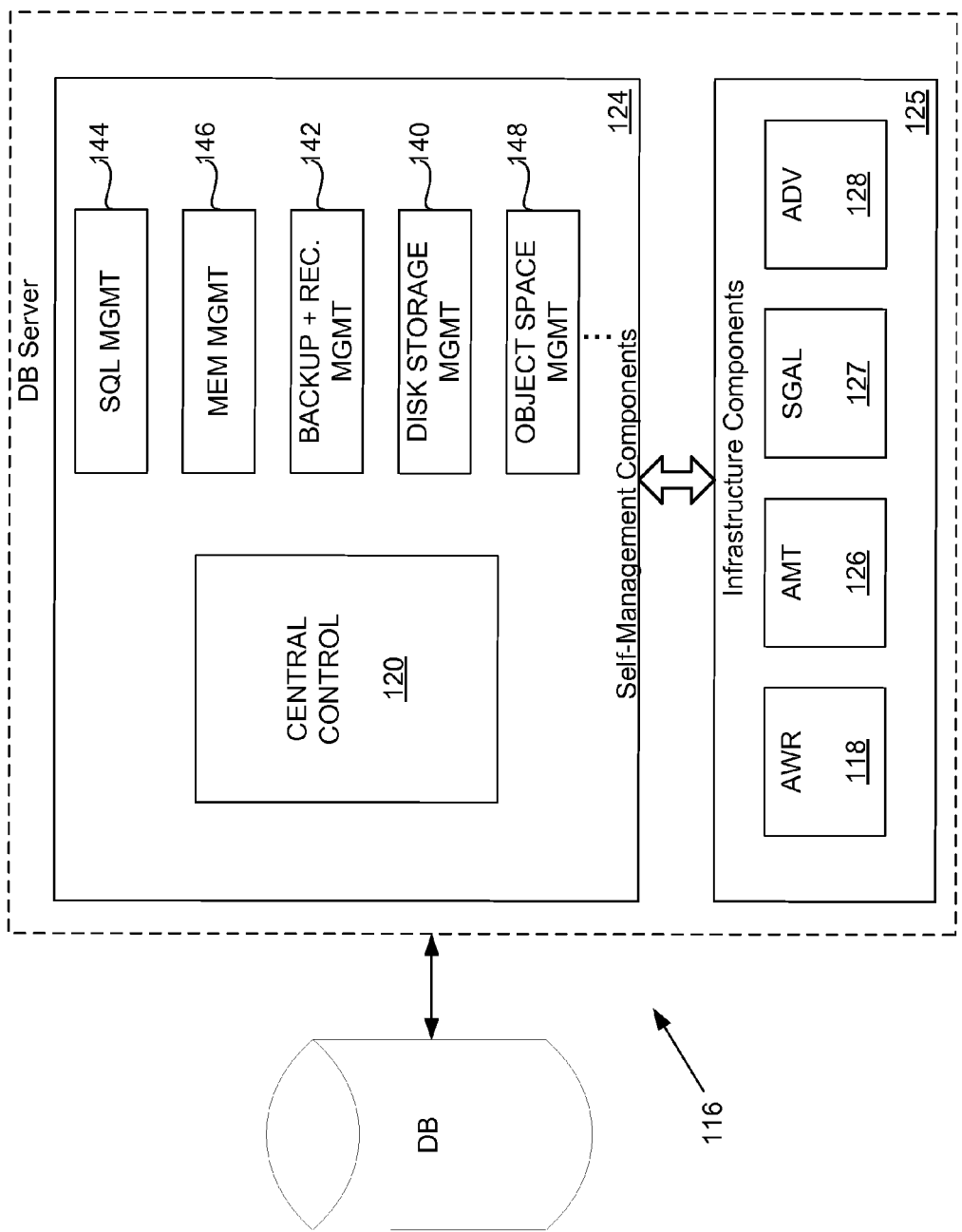
FIG. 2 illustrates the various components and modules of a self-managing database system according to one embodiment.
Figure 3:
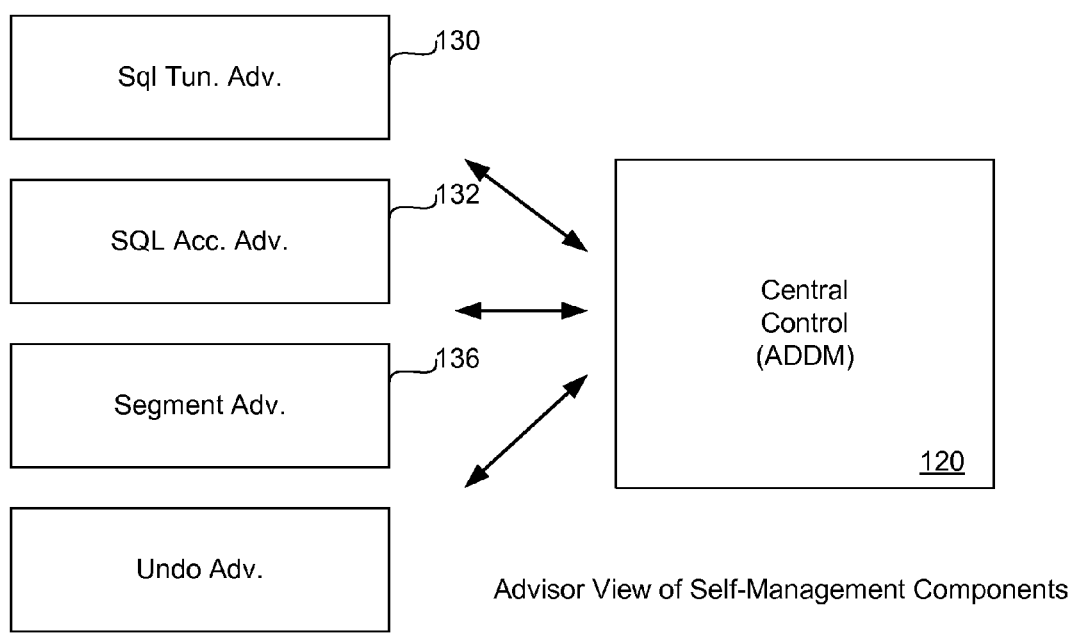
FIG. 3 illustrates an Advisor view of the self-management c components according to an embodiment of the present invention.

FIG. 2 illustrates the various components and modules of a self-managing database system 116 according to one embodiment. As shown, database system 116 includes self-management components 124, including a central management module, ADDM 120, and various internal infrastructure components 125, including AWR 118, an automated maintenance task component 126, a server-generated alerts component 127 and uniform advisory component 128. As shown in FIG. 3, advisory component 128 includes various advisory modules, such as SQL tuning advisor 130, SQL access advisor 132, segment advisor 136 and others as will be discussed below.

According to one embodiment, a variety of internal database client modules may interact with, and access information and statistics data collected and stored in, the workload repository 118. Internal clients include ADDM 120, self-management components 124 and infrastructure clients 125, which include, for example, Server-generated Alert, Advisory and Automatic Maintenance Task modules. Other internal database clients include a Time model module (collects and processes time-usage statistics on various database activities), a SQL tuning advisor module and a SQL segment advisor module. Various aspects of such internal database client modules and others can be found in U.S. Non-provisional application Ser. No. 10/775,513, entitled "The Time Model," filed Feb. 9, 2004; U.S. Non-provisional application Ser. No. 10/775,733, entitled "Capturing Session Activity as In-Memory Snapshots Using a Time-Based Sampling Technique Within a Database for Performance Tuning and Problem Diagnosis," filed Feb. 9, 2004; U.S. Non-provisional application Ser. No. 10/775,531, entitled "Automatic Database Diagnostic Monitor Architecture," filed Feb. 9, 2004; U.S. Provisional Application Ser. No. 60/500,869, entitled "Self Managing Database Architecture," filed Sep. 4, 2003; and U.S. Provisional Application Ser. No. 60/500,864, entitled "Automatic Database Diagnostic Monitor Architecture," filed Sep. 5, 2003, the contents of which are hereby incorporated by reference.

In one aspect, an enterprise management ("EM"; not shown) module is provided to expose the ADDM, workload repository and other internal and external clients to an external user. For example, the EM provides, in one aspect, a graphical user interface (GUI) that allows a user to interact with the ADDM, workload repository and various internal and external client modules. Thus, in one aspect, an external client such as a database administrator, using a browser on client system 12, may interact with a GUI module (e.g., enterprise management module) to access data and to view reports generated using the workload repository, ADDM or other module.

Intelligent Infrastructure

In one embodiment, as shown, the self-management infrastructure of the present invention includes Automatic Workload Repository 118 and infrastructure components 125: Automated Maintenance task infrastructure component 126, Server Generated Alerts component 127 and Advisory Framework component 128. Each of components 125 is configured, in one aspect, to analyze statistics from Automatic Workload Repository 118 and perform specific functions to enable other database components to be self-managing as is described herein. For example, in one aspect, each of self-management components 124 interacts with one or more of the infrastructure components 125 to enable that self-management component to self-manage an aspect of database functionality.

Automatic Workload Repository

The Automatic Workload Repository (AWR) 118 forms the foundation for the self-management functionality of the database 116. AWR 118 is the source of information that gives an historical perspective on how the database system 116 is being used and enables the database components (e.g., ADDM 120, self-management components 124, infrastructure components 125 and other components and modules) to make decisions which are accurate and specifically tailored for the environment in which that system is operating. AWR 118 is a built-in repository within the database that contains operational statistics about that particular database.

At regular intervals, a snapshot of all its vital statistics and workload information of the database is taken and stored in AWR 118 in one embodiment. By default, the snapshots are made every 60 minutes but an administrator has the option to change this frequency. The snapshots are stored in AWR 118 for a certain period of time (e.g., 7 days by default) after which they are automatically purged. AWR 118 is designed to be lightweight and manage itself completely in order to ensure that it does not impose any additional management burden on administrators.

AWR captures data that allows both system level and user level analysis to be performed, again reducing the requirement to repeat the workload in order to diagnose problems. In certain aspects, optimizations are implemented to ensure that the capture of data is performed efficiently to minimize overhead. One example of such optimizations is in the SQL statement capture. Working within the database, deltas of the data for SQL statements between snapshots are maintained. This allows the statistics capture process to capture only statements that have significantly impacted the load of the system since the previous snapshot in an efficient manner, rather than having to capture all statements that had performed above a threshold level of work since they first appeared in the system, as was previously the case. This both improves the performance of the SQL capture and greatly reduces the number of SQL statements that are captured over time.

Additional details, uses, features and optimizations of the AWR 118 can be found in U.S. Non-provisional application Ser. No. 10/934,771, entitled "Self-Managing Performance Statistics Repository for Databases," filed on even date herewith, which is hereby incorporated by reference. Also, aspects of the various statistics collected by the AWR 118 can be found in U.S. Non-provisional application Ser. Nos. 10/934,344, entitled "Automatic Workload Repository Battery of Performance Statistics," and 10/934,345, entitled "Database Performance Baselines," both filed on even date herewith, the contents of each of which are hereby incorporated by reference.

Automatic Maintenance Tasks

AWR 118 provides the database with very good "knowledge" of how the database is being used. By analyzing the information stored in AWR 118, the database is able to identify the need of performing routine maintenance tasks, such as query optimizer statistics refresh, rebuilding indexes, on-disk backup, etc. According to one embodiment, the Automated Maintenance Tasks (AMT) component 126 enables the database to automatically perform such operations and others. For example, if SQL Management module 144 detects that query performance may be bad due to stale query optimizer statistics, module 144 may schedule an automatic task using AMT 126, e.g., to perform a query optimizer statistics refresh operation. In one aspect, AMT 126 uses a rich scheduling functionality (through a feature called Unified Scheduler) to run such tasks in a pre-defined "Maintenance Window." By default, the maintenance window may starts at 10 PM every night and lasts till 6 AM the next morning and throughout the weekend. All attributes of the "Maintenance Window" are preferably customizable, including start/end time, frequency, days of the week, etc., allow it to be customized to the environment specific needs. Also, resource consumption of automated maintenance tasks can be limited by the database resource management component.

Additional aspects of the AMT 126 and the "Maintenance Window" can be found in U.S. Non-provisional application Ser. No. 10/903,594, entitled "Systems, Methods and Software for Automating Database Tasks," filed Jul. 29, 2004, the contents of which are hereby incorporated by reference.

Server Generated Alerts

According to one embodiment, for the problems that can not be resolved automatically and may require administrators to be notified, such as running out of space, the database contains a self-management infrastructure component, Server Generated Alerts (SGAL) 127. The SGAL 127 allows the database to monitor itself and send out alerts, e.g., to notify DBAs of any impending problem in an efficient and timely manner. For example, if Object Space Management component 148 detects that disk space is running low, it will use SGAL 127 to alert a user (e.g., DBA) to add more disk space. Since, in one aspect, the SGAL monitoring activities take place at the same time that the database performs its regular operation, it is much more efficient, substantially reducing the monitoring resource overhead, e.g., to negligible. SGAL 127 also ensures that the database is aware of the problem(s) the moment they arise, enabling the database to notify administrators just in time. This is in sharp contrast to the mechanism employed by monitoring tools external to the database that are available today, all of which regularly poll the database to evaluate the alert condition consuming a significant amount of system resources. To add to that, since the polling in current systems is typically performed at pre-set intervals, such polling may also cause the delay in problem detection and eventually in alert generation. In one aspect, if a pre-approved action is defined by a DBA, the action may be taken automatically. For example, if a predefined action is specified for a specific alert, that action may be taken automatically in response to that alert.

In one aspect, the alerts produced by SGAL 127 of the present invention not only notify of the problem, but also provide recommendations on how the problem being reported can be resolved. This ensures quicker problem resolution and helps prevent potential failures. Additional aspects of SGAL 127 can be found in entitled "[ ]", filed [ ], 2004, which is hereby incorporated by reference.

Advisory Framework

The database of the present invention, in one embodiment, includes an Advisory component 128. Advisory component 128, in certain aspects, includes a number of advisory modules, or advisors, for different sub-systems in the database to automatically determine how the operation of the corresponding sub-components could be further optimized. FIG. 3 illustrates various modules of advisory component 128 according to an embodiment of the present invention. As shown, SQL Tuning 130 and SQL Access 132 advisors are provided, for example, to provide recommendations for running SQL statements faster. Memory advisers are provided to help size the various memory components without resorting to trial-and-error techniques. A Segment advisor 136 is provided to handle space-related issues, such as recommending wasted-space reclamation, predicting the sizes of new tables and indexes, and analyzing growth trends. An Undo Advisor is provided to size the undo tablespace.

In order to ensure the consistency and uniformity in the way advisors function and allow various advisors to interact with each other seamlessly to provide integrated advice, the database includes an advisory framework. The advisory framework provides a consistent manner in which advisors are invoked and how the results are reported. Advisors may be used by the database itself to optimize its own performance, and they may also be invoked by administrators to obtain more insight into the functioning of a particular sub-component of the database. Providing such a uniform and consistent interface is advantageous as it makes it easier for administrators to use these advisors and use the generated information to get a better understanding of the database system. Additional aspects of the advisory component 128 and advisory framework and the various advisory modules can be found in U.S. application Ser. No. 10/925,831, entitled "The Advisor Framework," filed Aug. 24, 2004, which is hereby incorporated by reference.

Automatic Database Diagnostic Monitor (ADDM)

Building upon the data captured in AWR, in one embodiment, the database also includes a central control module, the Automatic Database Diagnostic Monitor (ADDM), which includes a self-diagnostic engine. ADDM 120 provides the overall operational control of self-management components 124 and interfaces with infrastructure components 125. In preferred aspects, ADDM 120 communicates with the various database component using a common protocol or set of protocols to control operation, recommend solutions and automatically trigger tuning and other mechanisms. For example, in response to a potential problem detected based on statistical analysis of statistics in AWR 118, ADDM 120 may recommend a solution or it may automatically trigger operation of an advisory module or a self tuning module. In this manner, under the control of ADDM 120, the various infrastructure and self-management components of the database system advantageously enhance the performance of the database, e.g., through operations designed to enhance database performance, such as operational speed, CPU usage, database availability, database stability, etc., examples of which are discussed herein. The ADDM 120 enables the database to diagnose its own performance and determine how any identified problems could be resolved. In certain aspects, ADDM runs automatically after each AWR statistics capture event (e.g., snapshot capture) and makes the performance diagnostic data readily available.

ADDM examines data captured in AWR and performs an analysis to determine any major performance issues on the system on a proactive basis and recommends solutions and quantifies expected benefits. In one aspect, ADDM 120 takes a holistic approach to the performance of the system, using time as a common currency between components. One goal of ADDM 120 is to identify those areas of the system that are consuming the most 'DB time'. In one aspect, ADDM 120 drills down to identify the root cause of problems rather than just the symptoms and reports the impact that the problem is having on the system overall. If a recommendation is made, it reports the benefits that can be expected, again in terms of time. The use of time throughout allows the impact of several problems or recommendations to be compared. Previously many problems were typically identified based on value judgments and experience rather than quantifiable impacts. One example of this is a system that is experiencing a high logon rate. A rule of thumb might have said that a logon rate of greater than 10 logons per second was a problem and should be fixed. However many systems can run significantly higher logon rates without noticeably affecting performance. Using the new time distribution data in AWR 118, ADDM 120 in one aspect reports quantitatively that logons are taking a certain amount, e.g., 20%, of time spent in the database. This quantified value makes it much easier to convince whoever needs to do the work to fix the problem or arrange for it to be fixed, rather than just making a statement such as 'I think that you are doing too many logons'.

In one aspect, ADDM 120 is configured to perform a holistic analysis of operations that were performed in database system 116. ADDM 120 receives information for operations that were monitored in database 116. In one embodiment, the information includes statistics determined using a time model and a wait model, both of which will be described in more detail below. The time model and wait model quantify an impact of certain operations in database system 116. For example, the time model and wait model are used to determine time values that quantify the impact of operations in database system 116.

ADDM 120 is configured to perform a self-diagnosis of performance problems. The diagnosis includes determining a set of rules that detect and categorize one or more possible performance problems that may occur. Operations in database 116 are detected and information is recorded. Information collected is analyzed to determine if a condition is satisfied for a rule, thus indicating a performance problem associated with the rule may exist. In one embodiment, the condition may be satisfied when a threshold is reached. For example, when a certain time value for an operation is reached, the operation may be considered a performance problem. Also, the time value may be expressed as a certain percentage of time recorded for all operations. Other ways to measure the impact using the time values recorded may also be appreciated.

ADDM 120 first reviews rules for general performance problems and then drills down to more narrow performance problems. Thus, a coarse granularity of performance problems is first reviewed and then finer granularities of the performance problems are reviewed until a root problem is identified. The root problem may be at any of the granularities reviewed and multiple root problems may be found.

In one aspect, a performance problem classification system is reviewed to determine a root problem. In one embodiment, possible performance problems are determined and categorized in a structure, such as a rules tree, where each node of the tree might have one or more rules associated with it along with conditions that determine whether the rules are satisfied.

If a rule is satisfied at a node, a performance problem may exist. In one aspect, ADDM 120 traverses the rules tree by reviewing performance problems from a coarse granularity to a finer granularity. The rules tree may include symptoms, which are performance problems that may lead to other performance problems and to finally, a root performance problem. If a symptom does not lead to a root problem, the symptom may also be considered a root problem If a specific problem exists at one level of the rules tree, ADDM 120 may determine other nodes that are connected to the current node. These connected nodes are performance problems that are related to and may be the cause of the performance problem of the parent node. As ADDM 120 traverses the rules tree, finer granularities of performance problems are determined until a root problem is determined.

Once a problem is determined, a recommendation for a solution may be determined. In one embodiment, the solution may be determined using a set of recommendation rules. The operation that caused the problem may be determined and information captured about the processing that was performed in database system 116 for the operation may be retrieved. The information is reviewed and a recommendation rule is used to determine a recommendation for a solution for the problem. In one aspect, the recommendation is specific to requests that caused the problem and is not a generic recommendation. Also, rationales for making the changes may be output. The rationales may be that a request is causing a certain operation to be performed or that a certain amount of time is being spent on some operations.

ADDM 120 may organize any diagnostics performed in a report and send them to a client system, e.g., user system 12, for output on a display interface. In one embodiment, the diagnostics are automatically performed in a self-diagnosis. Thus, the diagnosis is run automatically and may detect problems before they cause an error in database system 116. Also, a client system may request that certain diagnostics be performed by ADDM 120. For example, a determination of whether certain performance problems exist may be requested. ADDM 120 may process the requested diagnostics and return a report. Thus, diagnosis may be performed on-demand. A report that ADDM 120 generates may include the root problem found, any symptoms that were reviewed to determine the root problem, and also areas where no problems were found. Thus, a user may focus on the problems that were found and the symptoms that caused the problem. Also, because the areas where no problems were found are reported, a user does not have to waste time looking at those areas of database system 116 for a problem. Some of the common problems detected by ADDM 120 include:

CPU bottlenecks;
Poor connection management;
Excessive parsing;
Lock contention;
IO capacity;
Under sizing of memory structures, e.g., PGA, buffer cache, log buffer—in this case the ADDM may automatically trigger Automatic Shared Memory Management component 146 to re-adjust its memory pools;
High load SQL statements—in this case the ADDM may recommend that the SQL tuning advisor be run, or the ADDM may automatically trigger the SQL tuning advisor;
High PL/SQL and Java time;
High checkpoint load and cause, e.g., small log files, aggressive MTTR setting; and
RAC specific issues.

Additional problems detected by ADDM 120 as well as additional details about ADDM 120 can be found in U.S. Non-Provisional patent application Ser. No. 10/775,531, entitled "Automatic Database Diagnostic Monitor Architecture," filed Feb. 9, 2004, and entitled "Automatic Database Diagnostic Usage Models," filed Aug. 11, 2004, the contents of each of which are hereby incorporated by reference. In one aspect, upon detection of a potential problem, ADDM 120 may provides a recommendation that an advisor be run or ADDM 120 may automatically trigger an advisor module or a self-tuning mechanism.

Besides reporting the potential performance issues, in one aspect, ADDM 120 also documents non-problem areas of the system. The sub-components, such as IO, memory, etc., that are not significantly impacting the performance of the system are preferably pruned from the rules tree at an early stage and are listed so that a DBA can quickly see that there is little to be gained by performing actions in those areas. Again this saves time and wasted effort (both human and hardware) by not fixing things that will not impact the system performance overall.

Using the database of the present invention, administrators advantageously no longer need to first collect huge volume of diagnostic data and spend endless hours analyzing them in order to determine solutions to performance issues. With the present database, users can simply query the database what the performance issues may be and ADDM 120 does the rest. Table 1, below, technically illustrates this changed paradigm by comparing the steps required to diagnose a common performance problem, excessive hard parsing, before and after implementation of the present database system.

TABLE 1

Performance Diagnostic and Resolution:
Task: Diagnosing and resolving hard parse problems

| Before | After |
|---|---|
| 1. Examine system utilization | 1. Review ADDM recommendations |
| 2. Look at wait events | 2. ADDM recommends use of cursor_sharing |
| 3. Observe latch contention | |
| 4. See wait on shared pool and library cache latch | |
| 5. Review v$sysstat (difficult)6. See "parse time elapsed" > "parse time cpu" and #hard parses greater than normal | |
| 7. Identify SQL by Identifying sessions with many hard parses and trace them, or Reviewing v$sql for many statements with same hash plan (difficult) | |
| 8. Examine objects accessed and review SQL | |
| 9. Identify "hard parse" issue by observing the SQL contains literals | |
| 10. Enable cursor sharing | |

Time and Wait Models

The time model is used to quantify of the impact of operations on database system 116. In one embodiment, the impact of operations is measured using time values. For example, the time value may measure the time spent processing an operation in database 116 that may be considered wasteful or sub-optimal. By quantifying the impact of operations in database system 116, the impact of possible corrective actions may be measured before they are actually taken. For example, because operations are quantified in a time value, if a sub-optimal operation is corrected, the impact of correcting that operation is known because part of or all of the time spent on the operation may be eliminated.

In one embodiment, database time is measured using the time model. In one aspect, database time is different from response time. The response time is the time a user system waits for a request to return from database system 116. Database time is the time spent, e.g., by a database server, servicing the request. In one aspect, database time does not include the network portion of a user's response time. The network portion may include the time spent sending the request to database system 116 and the time spent to send the results back. Also, parts of a request may be executed in parallel by different executing threads, which are processes that operate to perform a task. If parts of a request are executed in parallel within the database system 116, the database time is the sum of all the time spent in the parallel executing threads of execution. This means that database time for a request executed in parallel may be much greater than the response time for the same request.

Operations that, when performed in database system 116, may be wasteful or sub-optimal are determined. In one aspect, a sub-optimal operation is an operation that may be attributed to some type of performance problem. For example, a sub-optimal operation may be an operation that does not need to be performed. Also, a sub-optimal operation may be an operation that may be performed more efficiently if performed in a different way. In one embodiment, operations that may be considered wasteful or sub-optimal include hard parses, soft parses, configuration problems, improperly sized caches, and other operations as will be apparent to one skilled in the art.

In one aspect, the wait model is a measurement of time spent in database server reads waiting for external events to complete. These events may be the completion of some requested service, such as a disk read, or they can be the release of some shared resource by another database server thread. This time (or some portion of it) is usually considered wasteful since the request cannot be further processed until the wait is finished. In one embodiment, wait classes are determined that categorize wait events that may occur in database system 116. For example, wait classes may include application, administration, concurrency, configuration, user I/O, network communications, and idle wait classes. An application wait class includes lock waits caused by row level locking or explicit lock commands. Administration wait classes include database administrator commands that cause all other users to wait as in an index rebuild. A commit wait class includes a wait for redoing log write confirmation after a commit operation. A concurrency wait class includes concurrent parsing and buffer cache and lock contention waits. A configuration wait class includes wait time due to undersized buffer space, log file sizes, buffer cache size, shared pool size, ITL allocation, HW enqueue contention, and ST enqueue contention. A user I/O wait class includes waits for blocks to be read off a disk. A network communications wait class includes waits for data to send over the network. An idle wait class includes wait events that signify the session is inactive.

The wait model is the timing of events where the current thread of execution has to wait for some service to be performed externally (such as a disk read) or for some shared resource to be released by another thread of execution. Thus, a wait is the case when the current thread of execution cannot proceed until some external event happens. The time model, in contrast, captures all time in a thread of execution spent on a specific operation, inclusive of any wait time occurring in this operation.

Additional aspects, features and uses of the time and wait models can be found in U.S. Non-Provisional patent application Ser. No. 10/775,513, entitled "The Time Model," filed Feb. 9, 2004, the contents of each of which are hereby incorporated by reference.

SQL Management

Application design issues are the most predominant cause of performance problems. All the tuning wisdom of developers, DBAs and system administrators cannot make up for the slowdown caused by architectural and design deficiencies of an application. One important part of database system performance tuning is, therefore, the tuning of SQL statements.

Since a query optimizer takes crucial decisions which have a tremendous impact on the performance of a query such as, whether to use an index or not, which join techniques to use if the query involves joining multiple table, etc., the cost-based optimizer has become the industry's most sophisticated, mature, and thoroughly tested query optimizer. The cost-based optimizer is used extensively by the major packaged applications such as those provided by Oracle, SAP, PeopleSoft, etc. Consequently, as used herein, "optimizer" is used synonymously with cost-based optimizer.

While a database using a cost-based optimizer may provide improved query optimization technology which maximizes the application/query performance without any administrator intervention in majority of the cases, there may still be a few cases where the nature of the application or uniqueness of data distribution may cause certain SQL statements to consume unusually high percentage of total system resources. In such situations, a typical SQL tuning process includes three basic steps:

1. Identify high load or top SQL statements that are responsible for a large share of the application workload and system resources, by looking at the past SQL execution history available in the system (e.g., the cursor cache statistics stored in the V$SQL dynamic view),
2. Verify that the execution plans produced by the query optimizer for these statements perform reasonably well,
3. Take possible corrective actions to generate better execution plans for poorly performing SQL statements.

These three steps are repeated until the system performance reaches a satisfactory level or no more statements can be tuned. Besides being extremely time consuming, the SQL tuning process outlined above also requires a high degree of expertise. Only a person with a deep knowledge of the application and database system can undertake this task.

In one aspect, the present database automates the SQL tuning process. In one aspect, ADDM 120 identifies SQL statements that are consuming unusually high system resources and are therefore causing performance problem. In addition, the top SQL statements in terms of CPU and shared memory consumption are automatically captured in AWR 118. Thus, the identification of high load SQL statements happens automatically in the present database and requires no intervention from the administrator.

After having automatically identified the top resource consuming SQL statements, the database automatically analyzes the SQL statements and recommends solutions using an automatic tuning capability of the query optimizer, or an automatic tuning optimizer component. In one embodiment, automatic SQL tuning is exposed via a SQL Tuning Advisor 130, which uses the advisor framework 128. The SQL Tuning Advisor 130 takes one or more SQL statements, and produces well-tuned plans along with tuning advice. The administrator does not need to do anything other than just invoking the SQL tuning advisor. Once that is done, the query optimizer analyzes the problem SQL statement(s) and recommends the solution. The solution is provided by the optimizer and not from any external tools using pre-defined heuristics. This provides several advantages: a) the tuning is done by the system component that is ultimately responsible for the execution plans and hence the SQL performance, b) the tuning process is fully cost-based and it naturally accounts for any changes and enhancements done to the query optimizer, c) the tuning process takes into account the past execution statistics of a SQL statement and customizes the optimizer settings for that statement, and d) it collects auxiliary information in conjunction with the regular statistics based on what is considered useful by the query optimizer.

The recommendation of the Automatic Tuning Advisor 130 may include one or more of the following categories:

1. Statistics Analysis: The Automatic Tuning Optimizer checks each query object for missing or stale statistics, and makes recommendation to gather relevant statistics. It also collects auxiliary information to supply missing statistics or correct stale statistics in case recommendations are not implemented. Since the database automatically gathers optimizer statistics in the AWR 118, this should not usually be the problem unless the automatic statistics gathering functionality has been disabled for some reason.
2. SQL Profiling: The Automatic Tuning Optimizer verifies its own estimates and collects auxiliary information to remove estimation errors. It also collects auxiliary information in the form of customized optimizer settings (e.g., first rows vs. all rows) based on past execution history of the SQL statement. It builds a SQL Profile using the auxiliary information and makes a recommendation to create it. When a SQL Profile is created it enables the query optimizer (under normal mode) to generate a well-tuned plan. SQL profiles enable tuning of queries without requiring any syntactical changes and thereby proving administrators and customers with an unique database-resident solution to tune the SQL statements embedded in packaged application.
3. Access Path Analysis: The Automatic Tuning Optimizer explores whether a new index can be used to significantly improve access to each table in the query, and when appropriate makes recommendations to create such indexes.
4. SQL Structure Analysis: Here the Automatic Tuning Optimizer identifies SQL statements that lend themselves to bad plans, and makes relevant suggestions to restructure them. The suggested restructurings may include syntactic as well as semantic changes to the SQL code.

Both Access Path and SQL structure analysis can be immensely useful in tuning the performance of an application under development or a homegrown production application where the administrators/developers have access to application code.

In one aspect, a SQL Access Advisor 132 is provided. Advisor 132 uses the advisor framework 128 and automatically analyzes the schema design for a given workload and recommend indexes and materialized views to create, retain or drop as appropriate for the workload. While generating recommendations, the SQL Access Advisor 132 considers the impact of adding new indexes and materialized views on data manipulation activities, such as insert, update and delete, in addition to the performance improvement they are likely to provide for queries. In one aspect, the SQL Access Advisor 132 provides a very easy to use interface and requires very little system knowledge. It can also be run without affecting production systems since the data can be gathered from the production system and taken to another machine where the SQL Access Advisor 132 can be run.

The present database makes optimizing application performance a simple matter. No matter how complex the problem or how restrictive the environment, the database of the present invention is able to provide the answers to SQL tuning problems. Table 2 depicts an example of how the Automatic Tuning Optimizer 130 dramatically alters the way SQL problems are detected and resolved.

TABLE 2

SQL Tuning: Before and After
Task: Tuning high load SQL statements coming from a packaged application

| Before | After |
|---|---|
| 1. Examine system utilization | 1. Review ADDM recommendations |
| 2. Look at wait events | |
| 3. See wait on DB scattered read | 2. Follow link to run Automatic SQL tuning |
| 4. Determine scope - system wide, module-dependent, user-dependent? | 3. Accept SQL Profile recommendations from SQL Tuning |
| 5. Identify SQL by (difficult) Identifying sessions with high DB scattered read waits and trace them, or Reviewing Top Sessions in OEM | |
| 6. Get explain plan | |
| 7. Examine objects accessed (size/cardinality) | |
| 8. Review SQL statistics and/or compare to object statistics (v$sql) (difficult) | |
| 9. Identify the problem | |
| 10. Contact packaged app vendor | |
| 11. Produce test case for vendor | |
| 12. Vendor produces patch/upgrade | |
| 13. Patch/upgrade installed in customer's next maintenance cycle | |

Memory Management

Memory is a precious system resource and administrators currently spend a significant amount of their time optimizing its use. One self-management enhancements of the present database system is Automatic Shared Memory (e.g., shared global area or "SGA") management. This functionality automates the management of shared memory used by a database instance and liberates administrators from having to configure the shared memory components manually. According to one aspect, DBAs can just specify the total amount of SGA memory available to an instance using a newly used parameter SGA_TARGET. The database server then automatically distributes the available memory among various components as required. The Automatic Shared Memory Management feature, implemented in a Memory management module 146 is based on sophisticated heuristics internal to the database that monitors the memory distribution and changes it according to the demands of the workload.

When the Automatic Shared Memory Management module 146 is enabled, the most commonly configured components are sized automatically in one aspect. These memory components include:

1. Shared pool (for SQL and PL/SQL execution)
2. Java pool for Oava execution state)
3. Large pool (for large allocations such as RMAN backup buffers)
4. Buffer cache Advantageously, there is no need to set the size of any of the above components explicitly. Whenever a component needs memory, it can request that it be transferred from another component via the internal auto-tuning mechanism. This will happen transparently without user-intervention.

The performance of each of these components is also monitored by the database instance. The instance uses internal views and statistics (e.g., stored in AWR 118) to determine how to optimally distribute memory among the automatically sized components. Thus, as the workload changes, memory is redistributed to ensure optimal performance with the new workload. This process is never complacent and always tries to find the optimal distribution by taking into consideration long term as well as short terms trends.

The administrator may still exercise some control over the size of the auto-tuned components by specifying minimum values for each of these components. This can be useful in cases where the administrator knows that an application needs a minimum amount of memory in certain components to function properly.

In one aspect, the sizes of the automatically tuned components are remembered across shutdowns, e.g., if a server parameter file (SPFILE) is used. This means that the system will not need to learn the characteristics workload from scratch each time and will pick up where it left off from the last shutdown.

Figure 4:
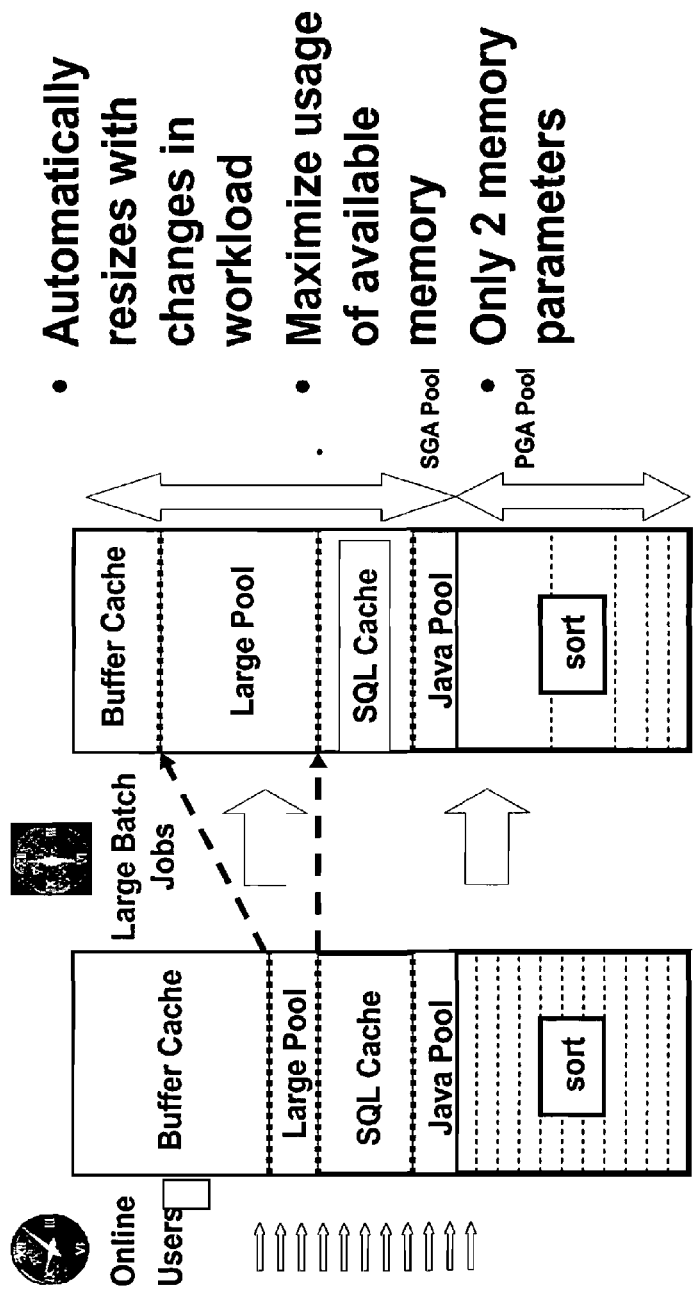
FIG. 4 illustrates an example of this feature of automatic shared memory tuning according to the present invention.

One significant benefit of using automatic SGA memory management is that the sizes of the different SGA components are flexible and adapt to the needs of a workload without requiring user intervention. Besides maximizing the use of available memory, the automatic shared memory management feature enhances workload performance as well. With manual configuration, it is possible that the compiled SQL statements will frequently age out of the shared pool because of its inadequate size. This may manifest into frequent hard parses and, hence, reduced performance. However, when automatic shared memory management is enabled, the internal tuning algorithm monitors the performance of the workload and increases the shared pool if it determines that doing so will reduce the number of parses required. FIG. 4 illustrates an example of this feature of automatic shared memory tuning according to the present invention. In one aspect, automatic shared memory management provides enhanced out-of-box performance, without requiring any additional resources or manual tuning effort. Having just a single parameter to deal with simplifies the job of administrators greatly. Using the present invention, DBAs can now just specify the amount of SGA memory an instance has its disposal; they do not need to figure out the sizes of individual components. In addition, they can be assured of the fact that no out of memory errors will be generated unless the system has truly run out of memory. Also, Table 3, below, illustrates the impact the present invention has on the task of resolving out-of-memory errors.

TABLE 3

SGA Memory Management: Before and After
Task: Resolving out of memory errors

| Before | After |
|---|---|
| 1. Launch Buffer Pool Advisor | (This space is intentionally left blank - No manual steps needed with Automatic Shared Memory Tuning) |
| 2. Examine output; check if Buffer Pool is over allocated | |
| 3. If so, reduce size of Buffer Pool | |
| 4. Launch Shared Pool Advisor | |
| 5. Examine output; check if Shared Pool is under allocated | |
| 6. If so, increase size of Shared Pool | |

Space Management

Space management is one of the most time consuming tasks for database administrators. According to one embodiment, the database of the present invention automatically manages space consumption, alerts administrators on potential space problems, e.g., using SGAL 127, and recommends possible solutions, e.g., using advisor framework 128.

The present invention provides, in one embodiment, a non-intrusive and timely check for space utilization monitoring in the database server. The database automatically monitors its space utilization during its normal space allocation and de-allocation operations and alerts administrators if the free space availability falls below pre-defined thresholds. In one aspect, the space monitoring functionality is set up out of box, causes no measurable performance impact, and is uniformly available across all tablespace types. Also, the same functionality is available both through Enterprise Manager (EM) as well as SQL. Since the monitoring is performed at the same time as space is allocated and freed up in the database server, this guarantees immediate availability of space usage information whenever the user needs it.

Notification is performed in one aspect using server generated alerts mechanism, e.g., server generated alerts module 127. The alerts are triggered when certain space related events occur in the database. For example when the space usage threshold of a tablespace is detected, an alert is raised. Another example of an alert is when a Resumable session encounters an out-of-space situation. In this case, an alert is sent immediately to the DBA to take corrective measures. For example, the DBA may choose to be paged with the alert information, or have the information delivered by e-mail or voice mail. The alerted DBA may then add space to the tablespace to allow the suspended operation to continue from where it left off.

U.S. non-provisional patent application Ser. No.10/934, 345, entitled "Database Performance Baselines," filed on even date herewith, the contents of each of which are hereby incorporated by reference, discusses thresholds based on statistics baselines determined from AWR statistics snapshots. Such baselines may be used by server generated alerts module 127.

In one aspect, the database includes a default set of alert thresholds. A DBA may override the default(s) for a given tablespace or set new default(s) for the entire database, e.g., using the EM GUI.

DBAs face a lot of challenges in managing space allocated to segments. Space may get over allocated because of the difficulty to predict the space requirement of an object or because of the inability to predict the growth trend of an object. On tables that are heavily updated, for example, the resulting segment may have a lot of internal fragmentation and maybe even row chaining. These issues may result in a wide variety of problem symptoms in the database from poor performance to space wastage. The present database provides new features/functionality to address these challenges.

The Segment Advisor 136 of the present database, in certain aspects, uses framework 128 and predicts the size of a given table based on its structure and estimated number of rows. This is a powerful "what if" tool that allows estimation of the size of an object before it is created or rebuilt. If tablespaces have different extent management policies, Segment Advisor 136 helps decide the tablespace that will cause least internal fragmentation. The Segment Advisor 136 works for tables with indexes on them as well as index organized tables.

In certain aspects, a growth trend report is provided to a DBA. The growth trend report takes the DBA to the next step of capacity planning—planning for growth. Most database systems grow over time. Planning for growth is an important aspect of provisioning resources. In order to aid this process, the present invention tracks historical space utilization in the AWR 118 and uses this information to predict the future resource requirements.

In the present database, in certain aspects, Object Space Manager 148 has the. ability to perform an in-place reorganization of data for optimal space utilization by shrinking a segment. Shrinking a segment makes unused space available to other segments in the tablespace and may improve the performance of queries and DML operations.

The segment shrink functionality provides the ability to both compact the space used in a segment and then deallocate it from the segment. The deallocated space is returned to the tablespace and is available to other objects in the tablespace. Sparsely populated tables may cause a performance problem for full table scans. By performing a shrink operation, data in the table is compacted and the high water mark of the segment is pushed down. This makes full table scans read less blocks and hence, run faster.

Segment shrink in one aspect is an online operation—the table being shrunk is open to queries and DML while the segment is being shrunk. Additionally, segment shrink is performed in place. This is an advantage over performing Online Table Redefinition for compaction and reclaiming space. The DBA may schedule a segment shrink operation for one or all the objects in the database, e.g., as nightly jobs, without requiring any additional space to be provided to the database.

Segment shrink works on heaps, index organized tables (IOTs), large objects (LOBs), Materialized Views and Indexes with row movement enabled in tablespaces with Automatic Segment Space Management. When segment shrink is performed on tables with indexes on them, the indexes are automatically maintained when rows are moved around for compaction. In one aspect, user defined triggers are not fired, however, because compaction is a purely physical operation and does not impact the application. Note that segment shrink can be performed only on tables with row movement enabled. Only applications that explicitly track row ids of objects will not be able to be shrunk because the application tracks the physical location of rows in the objects.

In one aspect, if ADDM 120 determines that one or more segments are being heavily used by a high-load SQL, ADDM 120 may automatically trigger segment advisor 136 to run, or it may recommend that segment advisor 136 be run. Segment Advisor 136, in one aspect, identifies candidate segments for shrinking, and may also use AMT 126 to schedule automatic shrinking of a segment. The Segment Advisor 136 performs growth trend analysis on individual objects to determine if there will be any additional space left in the object in, for example, 7 days. It then uses the reclaim space target to select candidate objects to shrink. The Segment Advisor 136 may be invoked in a comprehensive mode. In this mode, in addition to using the pre-computed statistics in the workload repository 118, the Segment Advisor 136 performs sampling of the objects under consideration to refine the statistics for the objects. Although this operation may be more resource intensive, it may be used to perform a more accurate analysis, when desired.

Storage Management

Storage layout and configuration can have a significant impact on overall database performance. DBAs, in conjunction with storage and network administrators, therefore have to deal with difficult tasks such as looking for hotspots that negatively affect performance and moving data files around to reduce contention.

The present database, in one aspect, provides an Automatic Storage Management (ASM) module 140 that provides a vertical integration of the file system and volume manager specifically built for the database files, e.g., Oracle database files. ASM 140 distributes I/O load across all available resource to optimize performance while removing the need for manual I/O tuning (spreading out the database files avoids hotspots). ASM 140 helps DBAs manage a dynamic database environment by allowing them to grow the database size without having to shutdown the database to adjust the storage allocation.

Automatic Storage Management 140 allows the DBA to define a pool of storage (called a disk groups) and then the database kernel manages the file naming and placement of the database files on that pool of storage. The DBA can change the storage allocation (adding or removing disks) with new SQL commands (e.g., create diskgroup, alter diskgroup and drop diskgroup). One can also manage the disk groups by using Enterprise Manager (EM) and a Database Configuration Assistant (DBCA).

The present database system provides DBAs a simplified management interface for storage resources. Automatic Storage Management module 140 eliminates the need for manual I/O performance tuning. It virtualizes storage to a set of disk groups and provides redundancy options to enable a high level of protection. ASM 140 facilitates non-intrusive storage configuration changes with automatic rebalancing. It spreads database files across all available storage to optimize performance and resource utilization. ASM 140 saves DBAs time by automating manual storage and thereby increasing their ability to manage larger databases and more of them with increased efficiency.

Backup & Recovery Management

The AMT infrastructure provides the ability to automatically schedule an on-disk backup procedure. All that DBAs need to do is to specify the time window when they want the automatic backups to run. This automation leverages a number of new functionality introduced in the present database to simplify disk-based backups. In the present database, a unified storage location for all recovery related files and activities in the database, called the Flash Recovery Area, may be defined using an initialization parameter, e.g., DB_RECOVERY_FILE_DEST. All files that are needed to completely recover a database from a media failure, such as control files, archived log files, flashback logs (introduced in the database), backups (an example is Oracle's RMAN which manages database backup), etc., are part of the Flash Recovery Area. Allocating sufficient space to the Flash Recovery Area ensures faster, simpler, and automatic recovery of the database. The Flash Recovery does a lot more than just providing a unified location for recovery related file; it manages the files stored in this location in an intelligent manner to maximize the space utilization and avoid out of space situations to the extent possible. Based on a specified RMAN RETENTION POLICY, the Flash Recovery Area automatically deletes obsolete backups and archive logs that are no longer required based on that configuration.

Incremental backups provide the capability to backup only the changed blocks since the previous backup. The present database delivers the ability for faster incrementals with the implementation of a change tracking file feature. When the block change tracking feature is enabled, the database tracks the physical location of all database changes. The change tracking file is automatically used to determine which blocks need to be read during an incremental backup and directly accesses that block to back it up. This reduces the amount of time needed for daily backups, saves network bandwidth when backing up over a network and reduces the backup file storage.

Besides making the incremental backups significantly faster, the present database also allows them to be used for updating a previously made backup. An Incrementally Updated Backups feature is provided in one aspect to merge the image copy of a datafile with an incremental backup resulting in an updated backup which contains the changes captured by the incremental backup. By providing this unique functionality, the present database system eliminates the requirement to make a whole database backup repeatedly. It is now possible to make a full database backup once for a given database and use incremental backups subsequently to keep the full back up updated. A backup strategy based on incrementally updated backups can help keep the time required for media recovery of a database to a minimum.

According to many studies, about 40% of application outages are caused by operator or user errors. Part of being human is making mistakes. But these errors are extremely difficult to avoid and can be particularly difficult to recover from without advance planning and the right technology.

The present database architecture leverages the unique technological advances in the area of database recovery due to human errors. In one aspect, the present database implements flashback technology that provides a set of new features to view and rewind data back and forth in time. The flashback features of the present invention offer the capability to query past versions of schema objects, query historical data, perform change analysis or perform self-service repair to recover from logical corruptions while the database is online.

The flashback technology of the present invention advantageously improves recovery by just operating on the changed data. The time it takes to recover the error is now equal to the same amount of time it took to make the mistake. The flashback technology of the present invention is implemented in various flashback modules 142 that include Flashback Database, Flashback Table, Flashback Drop, Flashback Versions Query, and Flashback Transaction Query.

Flashback Database quickly rewinds a database to a previous time, to correct any problems caused by logical data corruptions or user errors. Flashback Database eliminates the down time associated with restoring a backup and makes it extremely easy to recover from unanticipated errors.

Flashback Table provides the DBA the ability to recover a table or a set of tables to a specified point in time quickly, easily, and online. Flashback Table restores the tables while automatically maintaining its associated attributes such as—the current indexes, triggers and constraints, not requiring the DBA to find and restore application specific properties. Flashback Table alleviates the need for performing more complicated point in time recovery operations.

Flashback Drop provides a safety net when dropping objects in the database. When a user drops a table, the database automatically places it into the "Recycle Bin." The Recycle Bin is a virtual container where all dropped objects reside. Objects remain in the Recycle Bin until either the database needs to reclaim the space in order to accommodate new data or the owner of the dropped objects decides to permanently remove them using a new PURGE command. As long as a dropped object remains in the recycle bin, the object can be recovered using a simple SQL statement.

TABLE 4

Database Recovery: Before and After
Task: Recovering accidentally dropped table

| Before | After |
| --- | --- |
| (Tablespace Point-in-time Recovery) | 1. Single Command Recovery: FLASHBACK TABLE <table_name> TO BEFORE DROP; |
| 1. Prepare an auxiliary instance by first creating a password file | |
| 2. Create parameter file for auxiliary instance | |
| 3. Start auxiliary instance in NOMOUNT mode using SQL*Plus | |
| 4. Using RMAN interface to perform TSPITR | |
| 5. Using RMAN, connect to target database and bring tablespace in question online | |
| 6. Shutdown the auxiliary instance | |
| 7. Delete auxiliary instance data files, control files, and redo log files | |

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A self managing database system, comprising:

a database;

a server system that provides access to the database for a plurality of user systems, wherein the server system is configured to run:

a statistics repository module configured to automatically and periodically collect and compute performance statistics of the database;

a plurality of self-management components, each self-management component configured to self-manage an aspect of the database's functionality, wherein the plurality of self-management components include:

a SQL management module configured to interact with a SQL tuning advisor module and a SQL access advisor module to tune SQL statements;

a memory management module configured to automatically resize shared memory components based on characteristics of a current workload, the shared memory components including a shared pool and a buffer cache;

a back-up management module configured to automatically manage backup operations;

a disk storage management module configured to automatically distribute I/O loads across disk storage devices; and an object space management module configured to interact with a segment advisor to automatically manage sizes of segments in the database;

a plurality of infrastructure components configured to interact with one or more self-management components in the plurality of self-management components, the plurality of infrastructure components including an advisory framework component configured to provide a uniform interface for accessing and receiving information from a plurality of different advisory modules; and a central control module configured to automatically analyze statistics from the statistics repository module and interact with the plurality of self-management components and the plurality of infrastructure components to facilitate execution of at least one of a plurality of database performance enhancement operations, wherein possible database performance problems are categorized according to a rules hierarchy comprising a plurality of nodes, each node in the plurality of nodes being associated with one or more rules, and one or more conditions for satisfying the one or more rules, and wherein the step of automatically analyzing statistics from the statistics repository module includes analyzing the statistics in view of the rules hierarchy to determine a root performance problem.

2. The system of claim 1, wherein the plurality of infrastructure components further include an automatic maintenance task module and an alert generation module.

3. The system of claim 1, wherein the plurality of infrastructure components further include an alert generation module configured to send an alert to a client system in response to the detection of a database problem that cannot be self-corrected by the plurality of self-management components or the central control module.

4. The system of claim 3, wherein the database problem includes a condition wherein the database is running out of physical disk space.

5. The system of claim 1, wherein the plurality of infrastructure components further include an automatic maintenance task module configured to automatically detect and schedule a maintenance task within a time window so as to correct a performance problem.

6. The system of claim 1, wherein each advisory module in the plurality of different advisory modules is configured to analyze performance statistics for a particular database sub-system and provide recommended solutions for problems detected for the particular sub-system.

7. The system of claim 1, wherein the plurality of database performance enhancement operations include detecting performance problems for a database sub-system, alerting a user system to existing performance problems, alerting a user system to future performance problems, and providing a recommended solution for a performance problem to a user system.

8. The system of claim 1, wherein the plurality of different advisory modules include:
a SQL tuning advisor module configured to analyze high-load SQL statements and recommend a performance enhancement solution,
a SQL access advisor module configured to automatically analyze a schema for a workload and recommend indexes and materialized views to create, retain, or drop as appropriate for the workload;
a segment advisor module configured to predict a size of a given database table based on its structure and estimated number of rows; and
an undo advisor module configured to recommend sizing of an undo space.

9. The system of claim 1, wherein the central control module automatically invokes one of said plurality of self-management components after automatically analyzing performance statistics identifying an existing performance problem.

10. The system of claim 1, wherein the database performance enhancement operations include providing a recommendation to a user via a user system when a database performance problem is detected.

11. The system of claim 1, wherein the statistics repository automatically collects statistics at each of a plurality of collection event times, and wherein the central control module automatically analyzes the statistics after each collection event.

12. The system of claim 1, further including a graphical user interface (GUI) module configured to expose the performance statistics to a user system and to provide recommendations and alerts to the user system.

13. The system of claim 1, wherein each of the plurality of self-management components automatically invokes one of said plurality of infrastructure components after automatically analyzing performance statistics, to enable that self-management component to self-manage an aspect of the database's functionality.

14. The system of claim 1, wherein the statistics are determined according to a time model or a wait model.

15. A computer-implemented method of controlling a database system to automatically self-manage operation of a database, the method comprising:
from within the database system, automatically collecting and computing performance statistics for the database system;
automatically storing said performance statistics in the database system;
automatically analyzing said performance statistics within the database system to determine one or more performance related problems, wherein the step of automatically analyzing is performed by a central control module configured to interface with the database, a statistics repository module, a plurality of self-management components, and a plurality of infrastructure components, wherein the plurality of infrastructure components include an advisory framework component configured to provide a uniform interface for accessing and receiving information from a plurality of different advisory modules, and wherein the plurality of self-management components include:
a SQL management module configured to interact with a SQL tuning advisor module and a SQL access advisor module to tune SQL statements;
a memory management module configured to automatically resize shared memory components based on characteristics of a current workload, the shared memory components including a shared pool and a buffer cache;
a back-up management module configured to automatically manage backup operations;
a disk storage management module configured to automatically distribute I/O loads across disk storage devices; and
an object space management module configured to interact with a segment advisor to automatically manage sizes of segments in the database; and
within the database system, processing a performance related problem by either:
1) automatically correcting the performance related problem if the problem is self-correctable by the database system, or
2) automatically alerting a user system to the performance related problem, or
3) automatically providing a recommended solution to the user system to correct the problem,
wherein possible database performance problems are categorized according to a rules hierarchy comprising a plurality of nodes, each node in the plurality of nodes being associated with one or more rules and one or more conditions for satisfying the one or more rules, and wherein the step of automatically analyzing said collected statistics includes analyzing the statistics in view of the rules hierarchy to determine a root performance problem.

16. The method of claim 15, wherein automatically collecting performance statistics includes determining a plurality of statistics collection event times and at each of said collection event times capturing a snapshot of performance statistics for a plurality of database sub-systems.

17. The method of claim 15, wherein the plurality of different advisory modules include:
a SQL tuning advisor module configured to analyze high-load SQL statements and recommend a performance enhancement solution,
a SQL access advisor module configured to automatically analyze a schema for a workload and recommend indexes and materialized views to create, retain, or drop as appropriate for the workload; and
a segment advisor module configured to predict a size of a given database table based on its structure and estimated number of rows.

18. The method of claim 15, wherein automatically correcting the performance related problem is performed within a maintenance window determined automatically by an automatic maintenance task (AMT) module.

19. A computer-readable storage medium encoded with program code for controlling a database system to automatically self-manage operation of a database, the code including instructions for controlling one or more processors in the database system to:
within the database system, automatically collect and compute performance statistics for the database system;
automatically analyze said collected statistics within the database system to determine one or more performance related problems, wherein the instructions to automatically analyze are performed by a central control module configured to interface with the database, a statistics repository module, a plurality of self-management components, and a plurality of infrastructure components, wherein the plurality of infrastructure components include an advisory framework component configured to provide a uniform interface for accessing and receiving information from a plurality of different advisory modules, and wherein the plurality of self-management components include:
a SQL management module configured to interact with a SQL tuning advisor module and a SQL access advisor module to tune SQL statements;
a memory management module configured to automatically resize shared memory components based on characteristics of a current workload, the shared memory components including a shared pool and a buffer cache;
a back-up management module configured to automatically manage backup operations;
a disk storage management module configured to automatically distribute I/O loads across disk storage devices; and
an object space management module configured to interact with a segment advisor to automatically manage sizes of segments in the database; and
within the database system, process a performance related problem by either:
1) automatically correcting the performance related problem if the problem is self-correctable by the database system, or
2) automatically alerting a user system to the performance related problem, or
3) automatically providing a recommended solution to correct the problem,
wherein possible database performance problems are categorized according to a rules hierarchy comprising a plurality of nodes, each node in the plurality of nodes being associated with one or more rules and one or more conditions for satisfying the one or more rules, and
wherein the step of automatically analyzing said collected statistics includes analyzing the statistics in view of the rules hierarchy to determine a root performance problem.

20. The computer-readable storage medium of claim 19, wherein the instructions to automatically collect performance statistics include instructions to determine a plurality of statistics collection event times and at each of said collection event times capture a snapshot of performance statistics for a plurality of database sub-systems.

21. The computer-readable storage medium of claim 19, wherein the plurality of different advisory modules include:
a SQL tuning advisor module configured to analyze high-load SQL statements and recommend a performance enhancement solution,
a SQL access advisor module configured to automatically analyze a schema for a workload and recommend indexes and materialized views to create, retain, or drop as appropriate for the workload; and
a segment advisor module configured to predict a size of a given database table based on its structure and estimated number of rows.

22. The computer-readable storage medium of claim 19, wherein automatically correcting the performance related problem is performed within a maintenance window determined automatically by an automatic maintenance task (AMT) module.

* * * * *

UNITED STATES PATENT AND TRADEMARK OFFICE
CERTIFICATE OF CORRECTION

| | | |
|---|---|---|
| PATENT NO. | : 7,526,508 B2 | Page 1 of 1 |
| APPLICATION NO. | : 10/934076 | |
| DATED | : April 28, 2009 | |
| INVENTOR(S) | : Tan et al. | |

It is certified that error appears in the above-identified patent and that said Letters Patent is hereby corrected as shown below:

Title Page; item (56);
On page 2, in column 1, under "U.S. Patent Documents", line 35, delete "Soule et al." and insert -- Guay et al. --, therefor.

On page 2, in column 2, under "Other Publications", line 4, delete "Confernece," and insert -- Conference, --, therefor.

On page 2, in column 2, under "Other Publications", line 15, delete "Pct" and insert -- PCT --, therefor.

In column 3, line 31, delete "staibility" and insert -- stability --, therefor.

In column 6, line 10, delete "oserver" and insert -- server --, therefor.

In column 11, line 8, after "problem" insert -- . --.

In column 16, line 59, delete "Oava" and insert -- (java --, therefor.

Signed and Sealed this

Eighth Day of June, 2010

David J. Kappos
*Director of the United States Patent and Trademark Office*